United States Patent [19]

Chambers et al.

[11] Patent Number: 5,551,080

[45] Date of Patent: Aug. 27, 1996

[54] RADIO FREQUENCY CONNECTOR

[75] Inventors: Randall P. Chambers, Schaumburg; James J. Gfesser, Palatine; Martin E. Holmes, Hoffman Estates, all of Ill.; Kevin S. Oberman, Mt. Pleasant, Iowa

[73] Assignee: Motorola, Inc., Schaumburg, Ill.

[21] Appl. No.: 206,811

[22] Filed: Mar. 4, 1994

[51] Int. Cl.[6] .............................. H04B 1/08; H01Q 1/24; H01R 4/66

[52] U.S. Cl. .................... 455/348; 455/128; 455/129; 455/351; 343/702; 343/906; 439/95; 439/97; 439/668; 439/916

[58] Field of Search ................................. 343/702, 715, 343/900, 906; 439/916, 95, 97, 668; 455/129, 90, 347, 348, 349, 351, 89, 128

[56] References Cited

U.S. PATENT DOCUMENTS

| | | | |
|---|---|---|---|
| 4,523,197 | 6/1985 | Imazeki et al. | 343/702 |
| 4,718,110 | 1/1988 | Schaefer | 455/90 |
| 5,158,483 | 10/1992 | Fishman et al. | 439/668 |
| 5,262,792 | 11/1993 | Egashira | 343/702 |
| 5,276,454 | 1/1994 | Gonzalez et al. | 343/702 |
| 5,302,963 | 4/1994 | Wiggenhorn | 343/901 |

Primary Examiner—Reinhard J. Eisenzopf
Assistant Examiner—Lee Nguyen
Attorney, Agent, or Firm—M. Mansour Ghomeshi

[57] ABSTRACT

A communication device (200) includes an antenna nut (308) which can accommodate an antenna (204) or an antenna connector (100) without any internal switching mechanism. The antenna connector (100) includes a threaded center stud (102) that is coupled to the receiver input port via a nut (308) and a spring contact (310). Similarly, the antenna (204) is coupled to the input port (302) via the coupling port (206) providing for the mechanical coupling of the antenna (204) and the connector (100) through a hot center stud (102) which eliminates the need for any internal switching mechanisms. The ground to the connector (100) is provided via a metallic plate (404) which comes in contact with the ground plane of radio (304) through a ground contact tab (405) which provides a large ground plane for improved antenna performance.

8 Claims, 3 Drawing Sheets 5,551,080

RADIO FREQUENCY CONNECTOR

TECHNICAL FIELD

This invention relates generally to communication devices and more particularly to devices that utilize radio frequency connectors and antennas interchangeably.

BACKGROUND

Designers of radio communication devices often have to compromise some specifications in order to provide for ease of testability at the manufacturing site. One typical example of such a compromise is in the area or testing. In general, a radio is tested by having a test cable attached to the internal port at one end and a test equipment at the other. Using this cable, a radio's performance is measured and compared with a set of specifications. In the past, a switch internal to the radio has been used to indicate that a test cable, not an antenna is connected to the radio. This switch converts connection arrangements internal to the radio for incoming and outgoing signals and their respective polarities. Some communication devices have an antenna nut that is normally hot (RF signal) when an antenna is attached. The nut is switched to ground for the purpose of testing or attaching a remote antenna. A switch is used inside these radios to switch the hot nut to ground potential or vice versa. The connectors in these radios generally have threads on the outer ground shell and a phone plug tip that sticks through the center of the nut and inserts into the switch. The switch used in this operation is fairly expensive and is not justified in higher production volume and low cost radios. Accordingly, the need exists for a mechanism to provide for the connection of testing equipment and remote antennas to a regular communication device without utilizing any switching mechanisms.

DETAILED DESCRIPTION OF THE PREFERRED EMBODIMENT

The present invention provides for a connector that can be used to couple a remote antenna or a test equipment to a radio communication device without internal switching of signals. The principles of the present invention will be better understood by referring to a number of drawings beginning with FIG. 1.

Figure 1:
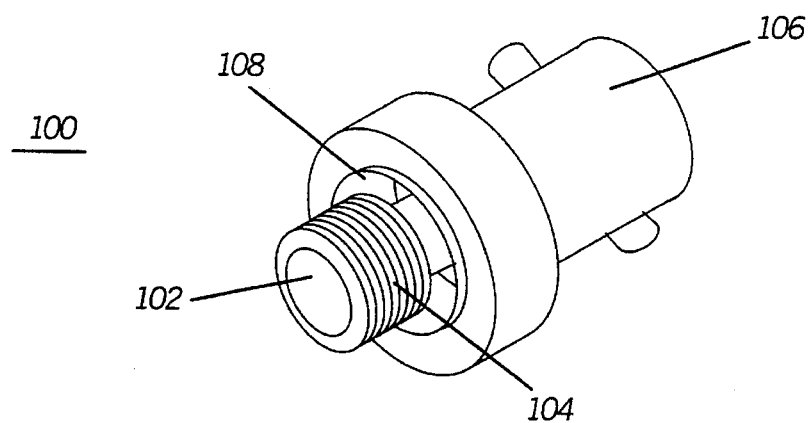
FIG. 1 shows an isometric view of a connector in accordance with the present invention.

Referring to FIG. 1, a connector 100 in accordance with the present invention is shown. The connector 100 includes a threaded center stud 102 for carrying an electrical signal. An outer shell 106 surrounds the center stud 102 and includes a BNC head. The outer shell 106 is devoid of any threaded sections which is normally used to provide ground connection via physical contact to a ground plane. The physical contact will be accomplished via the surface 108 which comes in contact with a ground plate as will be described later. The threaded center stud is in contrast with present BNC connectors which use non-threaded center pins for Signal routing. Also, the mechanical coupling of the connector 100 which is provided via the center stud 102 is in contrast with existing BNC connectors which use the threaded outer shell for this purpose. As will be explained later, this difference provides significant benefits in testing a radio communication device without any switches.

Figure 2:
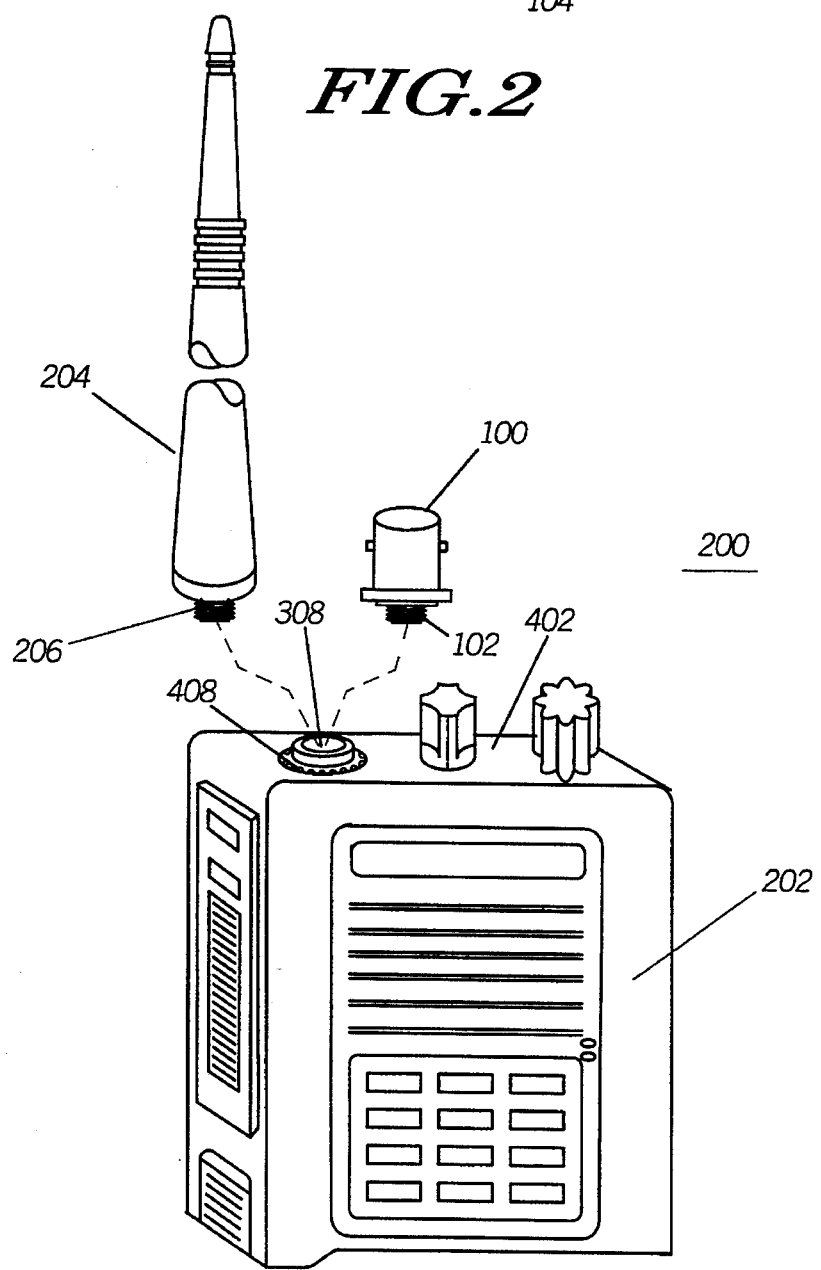
FIG. 2 shows a communication device in accordance with the present invention.
Figure 3:
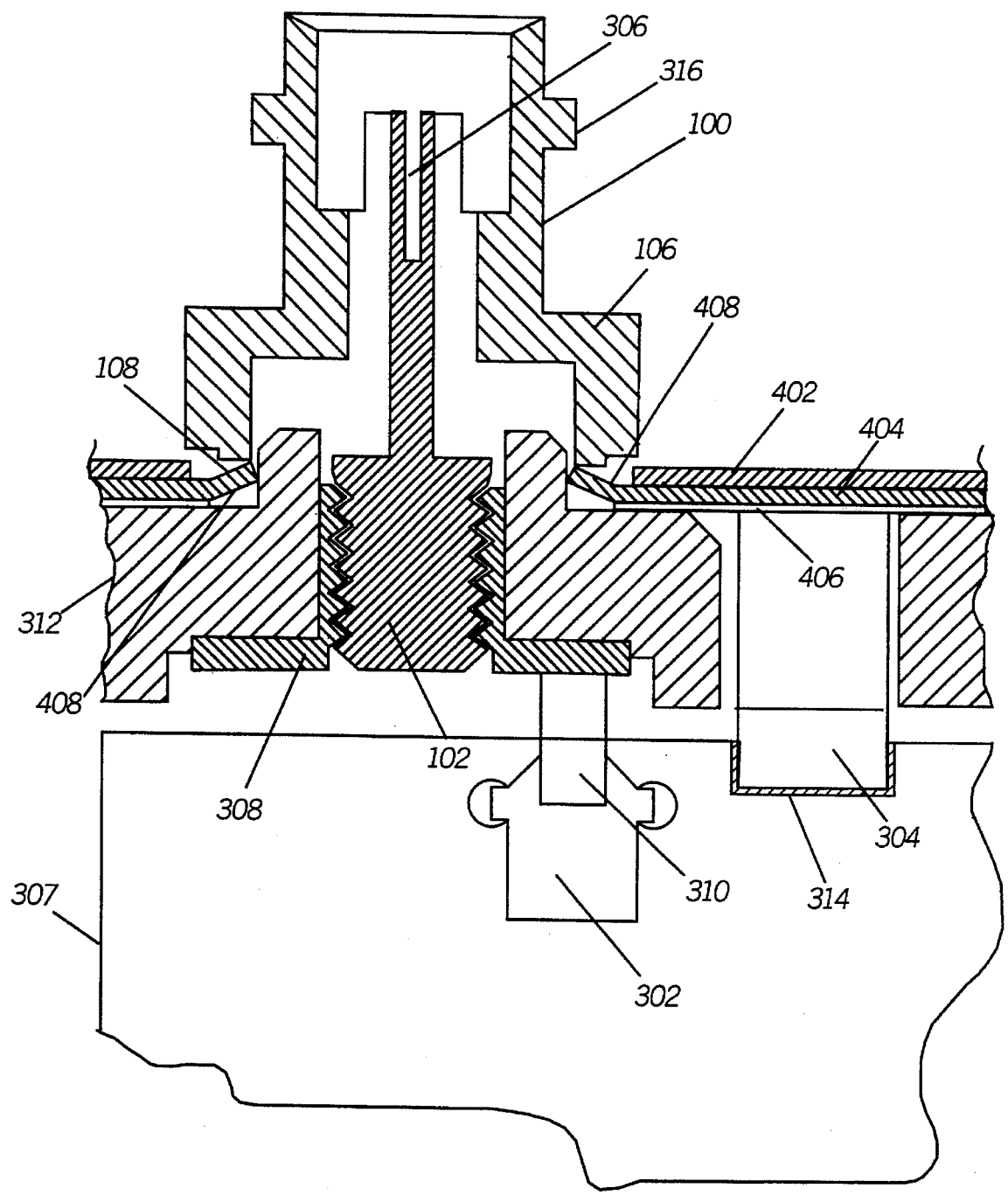
FIG. 3 shows a cross sectional of a portion of the radio in accordance with the present invention.

Referring now to FIG. 2, a radio communication device 200 is shown in accordance with the present invention. The radio 200 includes a receiver for receiving a radio frequency signal. Optionally, radio 200 can also include a transmitter section for transmitting signals as well as having a receiver for receiving signals. An enclosure 202 is used for housing the receiver. A first major surface, preferably the top of the housing 202 accommodates an escutcheon 402 underneath which an antenna plate 404 (FIG. 4) is located. The antenna plate 404 is preferably metallic and includes finger tabs 408 that are used to connect the antenna plate 404 to the surface 108 of the antenna connector 100. The antenna plate 404 is internally grounded to the ground of the receiver via a grounding contact 304 (FIG. 3). Accordingly, the shell 106 of the antenna connector 100 will be at ground level. Also shown in FIG. 2 is an antenna 204 having a threaded base 206. A nut 308 is used to accommodate the antenna 204 when an antenna is desired or the connector 100 when a remote antenna is desired. When needed, the connector 100 may also be used to couple the radio 200 to a test equipment for testing purposes. As will be demonstrated later, the connection of the antenna connector 100 to the radio 200 does not require internal switching.

Figure 4:
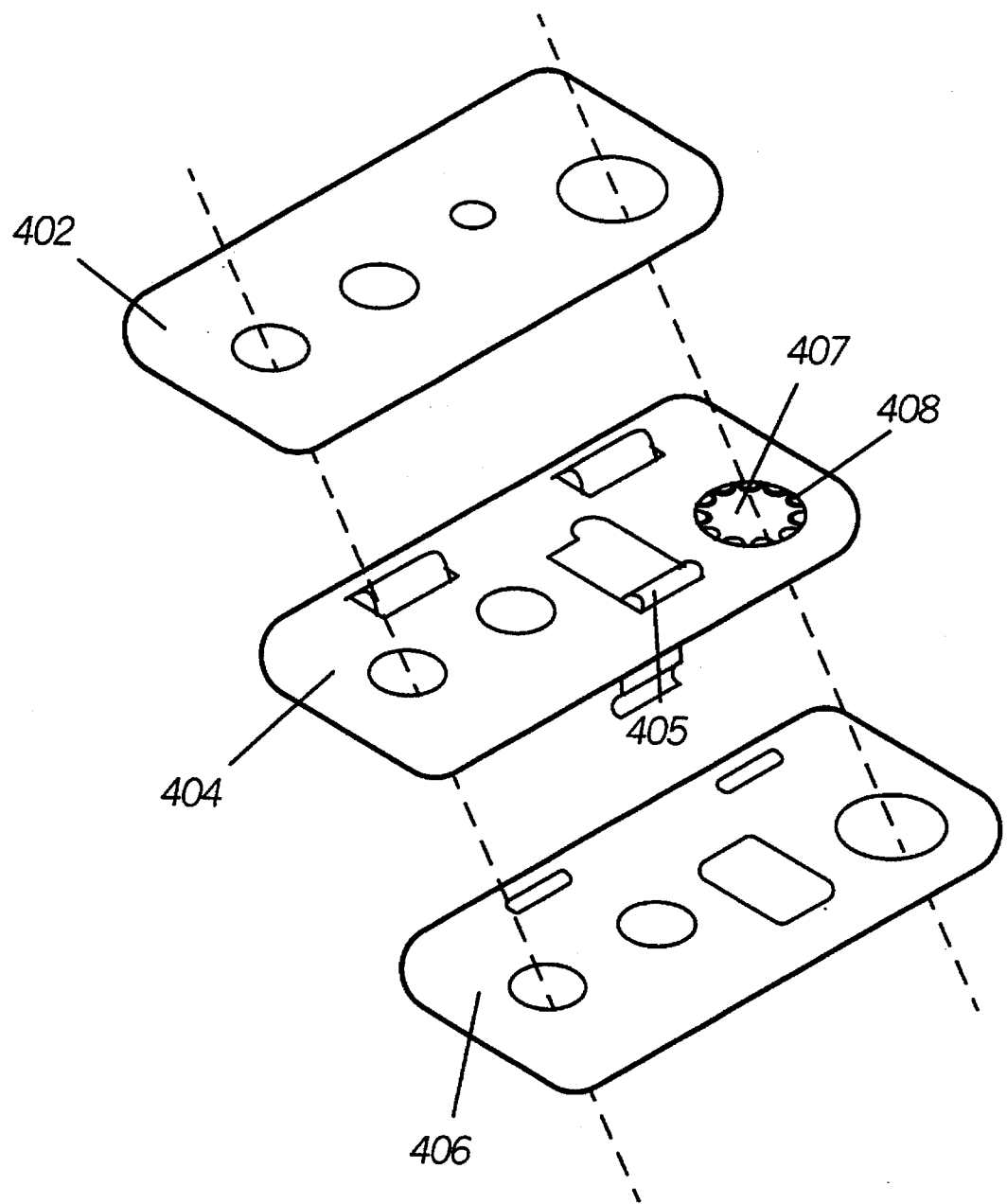
FIG. 4 shows an antenna plate assembly in accordance with the present invention.

Referring now to FIG. 4, the antenna plate 404 along with the escutcheon 402 is shown. As can be seen, the plate 404 includes an opening or cavity 407 having a circumference and defined by an outer wall in which a plurality of finger tabs 408 are located. A grounding contact 404 is provided for coupling the metallic plate 404 to the electrical ground plane of the receiver. The adhesive 406 is used as an adhesion media for coupling the metallic plate 404 to the major surface of the radio 200. The escutcheon 402 is positioned over the plate 404 in order to add to the appearance of the radio 200. In combination with the adhesive on the metallic plate 404, this escutcheon 402 with its adhesive provides a weather seal. It prevents water and foreign material from entering the radio enclosure 202 through the holes in the metallic plate such as the hole left from forming the contact 405. As can be seen from FIG. 2, the finger tabs 408 protrude out ever so slightly to provide for a contact between the connector 100 and the ground plane of the receiver through the grounding contact 405.

It is noted that The ground plate also helps to improve the antenna performance by providing a "ground-mirroring" effect, which makes the antenna look more like a dipole, or bigger than it actually is. The bigger the antenna looks, the better it performs in terms of efficiency and range. If the ground plate were infinitely large (the best case), the antenna would look twice as big. In the preferred embodiment, the plate 404 will not look quite that big, but it will be an improvement over no ground plate. Thus the antenna will be more efficient, and will be able to send the transmitted signal farther (in the case radio 200 is a transceiver), and be more sensitive when receiving a signal.

Referring to FIG. 3, a cross sectional view of the antenna connector area of the radio 200 is shown. As can be seen, the connector 100 is screwed onto a nut 308 which is attached to a radio control top 312 which is preferably formed from plastic or any one of a number of other rigid insulative materials well known to those skilled in the art. The contact area 108 rests on the finger tabs 408, thereby providing a connection between the outer shell 106 and the ground plate 404 through the contact area 108. The ground plate 404 is coupled to the ground of the receiver printed circuit board 307 via the ground contact point 304. Similarly, the receiver board 307 includes a radio frequency input port 302. In the case where radio 200 is a two-way radio transceiver input port 302 would be an input/output port. A spring contact 310 couples the input port 302 to the nut 308. This completes the connection of the center stud 102 to the radio frequency input port 302 of the receiver. Center stud 102 includes an opening 306 for receiving the center pin found on the connector which mates with connector 100. The ground plane of the receiver circuit board 307 is designed in accordance with the requirement of the communication device 200. The ground pad 304 may be strategically located to aid the plate 404 in providing a ground plane for the antenna 204. A ground contact terminal 314 located on printed circuit board 307 electrically couples to ground contact point 304. The combination of the nut 308 and the spring 310 provide for a coupler for coupling the center threaded stud 102 to the input port 302. Connector 100 includes a BNC head portion 316 for mating to an external male BNC connector.

The antenna 204 is preferably a non-coaxial antenna. A non-coaxial antenna includes only a center conductor that must be coupled to the radio frequency input port of the receiver. As such, the non-coaxial antenna requires a ground plane. The metallic antenna plate 404 which is coupled to the ground plane of the receiver 307, provides this ground plane for the antenna 204. The center conductor of the antenna 204 is similar to the center stud 102 of the connector. The plastic cover of the antenna 204 is similar in diameter and shape to the outer shell of the connector 100. When assembled to the radio 202, the insulating plastic cover comes in contact with the escutcheon 402. The coupling port 206 of the antenna 204 attaches to the nut 308 then through the spring contact 10 comes in contact with the input port 302 of the radio.

In summary, it has been shown that by employing the newly designed RF connector 100 with its threaded center stud, the need for a new switching mechanism within the radio 200 is eliminated. The center stud 102 comes in direct contact with the receiver input port 302 through the nut 308 and the spring contact 310. Contrary to previous BNC designs where the threaded section was connected to the ground plane of the radio the connector of the present invention accomplishes ground connection by allowing the outer shell to contact the metallic ground plane 404 which is used as the antenna ground plane. Finger tabs 408 are used to couple the antenna connector 100 to the ground plane 304 while preventing similar connection between the antenna 204 and the ground plane 304. This is highly significant as it is no longer necessary to provide a switching mechanism when the antenna 204 must be replaced by a connector for remote antenna coupling or testing purposes. This is accomplished by allowing the threaded center stud 102 to carry radio frequency signal and provide stable mechanical coupling.

A benefit of the present invention is that the antenna connector 100 allows the signal to be carried through the mechanical coupling which is provided by the center stud 102 and the nut 308. Because of this coupling scheme, there is no need to change the functionality of the nut 308 (from hot to ground) or vise versa as is practiced in the prior art. This purpose is accomplished by making contact with the metallic plate 404 that sits on the major surface of the radio 200. The contact tab 405 which protrudes through the major surface of the radio 200 makes contact with the ground plane of the printed circuit board. Spring fingers 408 are used by the ground shell of the antenna connector 100 to provide grounding for a test equipment or a remote antenna. As can be seen, the deficiencies of the prior art in requiring an internal switch are eliminated.

What is claimed is:

1. A radio communication device, comprising:
   a receiver for receiving a radio frequency signal, the receiver having an electrical ground plane and a radio frequency input port;
   an enclosure for housing the receiver, the enclosure having a first major surface;
   a metallic plate attached to the first major surface and including:
      a grounding contact for coupling the metallic plate to the electrical ground plane of the receiver;
      at least one cavity defined by an outer wall and having a plurality of finger tabs on the outer wall;
   an antenna connector including:
      a threaded center stud;
      an outer shell for coupling 1;he antenna connector to the receiver ground plane via the plurality of finger tabs; and
   a coupler for coupling the center threaded stud to the radio frequency input port of the receiver.

2. The radio communication device of claim 1, wherein the antenna connector includes a BNC antenna connector.

3. The radio communication device of claim 1, wherein the coupler includes a nut.

4. The radio communication device of claim 1, wherein the coupler includes a spring contact.

5. The radio communication device of claim 1, further including an escutcheon attached to the first major surface.

6. A communication device, comprising:
   a receiver for receiving a radio frequency signal, the receiver having a signal input and a ground plane;
   a non-coaxial antenna having a coupling port;
   an enclosure for housing the receiver, the receiver having a first major surface;
   a metallic antenna plate attached to the first major surface for providing a ground plane for the antenna in order to render the non-coaxial antenna more efficient, the metallic plate including:
      a ground contact tab for coupling the metallic antenna plate to the ground plane of the receiver;
      at least one circular opening having a circumference and having a plurality of raised finger tabs on the circumference; and
   a coupler for coupling the coupling port of the non-coaxial antenna to the signal input of the receiver without contacting the raised finger tabs.

7. The communication device of claim 6, wherein the non-coaxial antenna includes an insulating cover which extends beyond the coupling port and prevents contact between the coupling port and the plurality of raised finger tabs.

8. The communication device of claim 6, further comprising:
   an antenna connector which may be selectively coupled to the coupler in order to allow the connection of a test cable to the receiver signal input in place of the antenna, the antenna connector including:
      a threaded center stud; and
      an outer shell for coupling to the receiver ground plane via the plurality of raised finger tabs.

* * * * *